(12) United States Patent
Bowman et al.

(10) Patent No.: US 7,206,330 B2
(45) Date of Patent: Apr. 17, 2007

(54) END-FACE SEAL FOR GRAPHITE ELECTRODES

(75) Inventors: Brian Bowman, Westlake, OH (US); Thomas William Weber, Cleveland, OH (US); Terrence Patrick Wells, Strongsville, OH (US); James J. Pavlisin, Cleveland, OH (US); William Varela, Parma Heights, OH (US)

(73) Assignee: UCAR Carbon Company Inc., Parma, OH (US)

( * ) Notice: Subject to any disclaimer, the term of this patent is extended or adjusted under 35 U.S.C. 154(b) by 0 days.

(21) Appl. No.: 11/119,422

(22) Filed: Apr. 29, 2005

(65) Prior Publication Data

US 2006/0002446 A1    Jan. 5, 2006

Related U.S. Application Data

(63) Continuation-in-part of application No. 10/760,947, filed on Jan. 20, 2004.

(51) Int. Cl.
*H05B 7/14* (2006.01)

(52) U.S. Cl. .......................................... 373/92; 373/95

(58) Field of Classification Search ................. 373/92, 373/95, 110, 88, 91, 93, 94; 403/296; 277/610; 156/91; 439/87, 427, 429; 287/127; 423/448
See application file for complete search history.

(56) References Cited

U.S. PATENT DOCUMENTS

| 2,836,806 A | * | 5/1958 | Stroup ......................... 439/87 |
| 3,404,061 A | | 10/1968 | Shane et al. ................. 161/125 |
| 3,540,764 A | | 11/1970 | Paus et al. ................... 287/127 |
| 4,895,713 A | | 1/1990 | Greinke et al. ............. 423/448 |
| 5,645,284 A | * | 7/1997 | Fitton ........................... 277/610 |
| 5,902,762 A | | 5/1999 | Mercuri et al. ................ 501/99 |

OTHER PUBLICATIONS

International Publication WO/03/051772 A1, PCT/US02/39749 filed Dec. 12, 2002, Applicant: Graftech Inc.

* cited by examiner

*Primary Examiner*—Quang Van
(74) *Attorney, Agent, or Firm*—Waddey & Patterson; James R. Cartiglia

(57) ABSTRACT

An end-face seal for graphite electrode joints, including a seal formed of a plurality of individual elements interlocked to form a unitary whole, and formed of a material having an oxidation rate equal to or less than that of the electrodes.

10 Claims, 2 Drawing Sheets

US 7,206,330 B2

END-FACE SEAL FOR GRAPHITE ELECTRODES

RELATED APPLICATION

This application is a continuation-in-part of co-pending application Ser. No. 10/760,947, filed Jan. 20, 2004, entitled "End-Face Seal for Graphite Electrodes," the disclosure of which is incorporated herein by reference.

BACKGROUND OF THE INVENTION

1. Technical Field

The present invention relates to an end-face seal for graphite electrodes, especially for large diameter graphite electrodes, a process for preparing the inventive end-face seal. More particularly, the invention concerns a multi-part seal used at the end faces of graphite electrodes to protect the surfaces of an electrode joint from oxidation. The seal can be efficiently produced and transported and is preferably formed of particles of expanded graphite

2. Background Art

Graphite electrodes are used in the steel industry to melt the metals and other ingredients used to form steel in electrothermal furnaces. The heat needed to melt metals is generated by passing current through a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Generally, electrodes are joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Alternatively, the electrodes can be formed with a male threaded protrusion or stub machined into one end and a female threaded socket machined into the other end, such that the electrodes can be joined by threading the male stub of one electrode into the female socket of a second electrode, and thus form an electrode column. The joined ends of two adjoining electrodes in such an embodiment is also referred to in the art as a joint.

Given the extreme thermal stress that the electrode and the joint (and indeed the electrode column as a whole) undergoes, mechanical/thermal factors such as strength, thermal expansion, and crack resistance must be carefully balanced to avoid damage or destruction of the electrode column or individual electrodes. For instance, longitudinal (i.e., along the length of the electrode/electrode column) thermal expansion of the electrodes, especially at a rate different than that of the pin, can force the joint apart, reducing effectiveness of the electrode column in conducting the electrical current. A certain amount of transverse (i.e., across the diameter of the electrode/electrode column) thermal expansion of the electrode in excess of that of the pin may be desirable to form a firm connection between pin and electrode; however, if the transverse thermal expansion of the electrode greatly exceeds that of the pin, damage to the electrode or separation of the joint may result. Again, this can result in reduced effectiveness of the electrode column, or even destruction of the column if the damage is so severe that the electrode column fails at the joint section.

Moreover, another effect of the thermal and mechanical stresses to which an electrode column is exposed is a gap forming in the electrode joint between two adjoining electrodes. Moreover, the engineering of the pin and female sockets, or male stub and female socket, can lead to a gap intentionally existing between the two adjoining electrodes in a joint. When a gap forms in a joint, either intentionally or unintentionally, oxidation of the threads of the pin or male stub and other joint surfaces can occur, resulting in loss of material and what is referred to as "necking." Necking occurs when sufficient material is oxidized away from the joint surfaces to narrow and thus weaken the joint between the two end faces. Necking reduces effectiveness of the electrode column in conducting the electrical current, reduces the mechanical strength of the joint, and can ultimately lead to failure of the joint and catastrophic loss of the electrode column. For instance, when necking occurs to a significant degree, the vibrations normally experienced by an electrode column in use in the furnace can lead to cracks and ruptures in the pin or male stub, or the female electrode engaged by the pin or socket, and separation of the joint and loss of the electrode column below the affected joint.

In U.S. Pat. No. 3,540,764, Paus and Revilock suggest the use of an expanded graphite spacer disposed between the end faces of adjacent electrodes in order to increase electrical conductivity and thermal stress resistance of the joint. The nature of the Paus and Revilock spacer and its placement, however, is such that a gap is created in the joint where it may not have otherwise been, thereby contributing to joint looseness and potential for failure.

Moreover, because of the diameter of graphite electrodes, which can be 750 millimeters (mm) or greater in diameter, materials intended for use between adjoining electrodes are approximately the same diameter, with a central opening at least as large in diameter as the pin or male stub used to join adjoining electrodes. Because of this, transport of such materials can be problematic, both because of the size of the materials being transported and because the structural integrity of large cylindrical materials may not be able to withstand the stress of transport. In addition, depending on the productions methods employed, the production of large diameter materials with large central openings can result in a great deal of waste material.

What is desired, therefore, is a seal for reducing oxidation at the surfaces portions of graphite electrode joints, which can be formed as a plurality of individual elements for transport. It is also highly desirable to achieve these property benefits without using high quantities of expensive materials.

SUMMARY OF THE INVENTION

It is an aspect of the present invention to provide a multi-part seal for the end faces of graphite electrodes.

It is another aspect of the present invention to provide a multi-part seal for the end faces of graphite electrodes which reduces or eliminates the oxidation of the surfaces of electrode joints.

It is yet another aspect of the present invention to provide a multi-part seal for the end faces of graphite electrodes which produces electrode column joints having improved strength and stability.

These aspects and others that will become apparent to the artisan upon review of the following description can be accomplished by providing an electrode joint comprising two joined graphite electrodes and having a multi-part seal interposed between the electrodes, the seal comprising a compressible material, especially compressed particles of exfoliated graphite. The seal is provided as a plurality of individual elements for ease of transport/storage. The seal material preferably comprises material having an oxidation rate equivalent to or less than that of the electrodes. In an especially preferred embodiment, the electrical conductivity of the seal is greater in the direction extending between the electrodes than it is in the direction orthogonal thereto. In order to accomplish this, the seal should advantageously comprise a spiral wound sheet of compressed particles of exfoliated graphite.

The two joined electrodes forming the joint can each comprise a female threaded socket machined therein and further comprising a pin comprising opposed male threaded sections which engage the female threaded sockets of the electrodes to form the joint. Alternatively, one of the electrodes can comprise a male threaded stub and the other electrode can comprise a female threaded socket, wherein the male threaded stub engages the female threaded socket to form the joint.

To form the inventive seal, sheets of compressed particles of exfoliated graphite are overlaid, preferably with the use of an adhesive therebetween, and then trimmed to the desired size and shape if necessary, to form individual end face seal component elements. Advantageously, the ends of the individual elements have structures thereon to facilitate joinder with the adjacent elements. For instance, one end of an element can have a tab or tongue with the corresponding end of the adjoining element having a notch into which the tab fits. In any event, a plurality of such elements are shaped to cooperate to form a unitary end face seal for graphite electrode joints. When joined to form the seal, it should have an outer diameter generally equal to the outer diameter of the electrode joint and an inner opening which is at least the diameter of the male tang or pin to be employed.

Alternatively, to form the inventive seal, one or more sheets of compressed particles of exfoliated graphite is provided and then wound (for instance around a bolster having a diameter equal to the inner opening of the seal) to form a spiral wound seal suitable for use between the electrodes in an electrode joint. The seal should have an outer diameter generally equal to the outer diameter of the electrode joint and an inner opening, and can but does not necessarily have an adhesive interposed between the layers of the spiral wound sheet of compressed particles of exfoliated graphite. The thusly-formed seal is then divided into a plurality of individual elements, preferably three of approximately equal angular length. As above, the ends of the individual elements should advantageously have structures thereon to facilitate joinder with the adjacent elements. For instance, one end of an element can have a tab or tongue with the corresponding end of the adjoining element having a notch into which the tab fits.

It is to be understood that both the foregoing general description and the following detailed description provide embodiments of the invention and are intended to provide an overview or framework of understanding and nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

DETAILED DESCRIPTION OF THE PREFERRED EMBODIMENT

Figure 1:
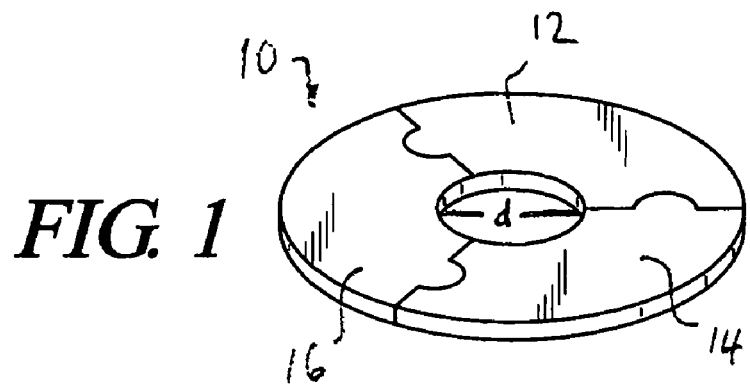
FIG. 1 is a side perspective view of a multi-part end-face seal for a graphite electrode in accordance with the present invention.
Figure 2:
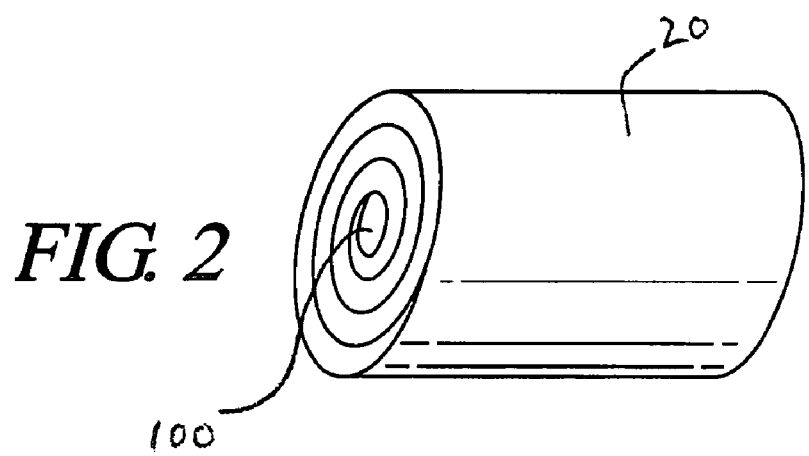
FIG. 2 is a side perspective view of a spiral wound flexible graphite structure from which the end-face seal of FIG. 1 is derived.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, in graphite electrodes for use in processing steel, particles up to about 25 millimeters (mm) in average diameter are employed in the blend. The particulate fraction preferable includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 700 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours. Once graphitization is completed, the finished article can be cut to size and then machined or otherwise formed into its final configuration.

The inventive seal comprises a material that is disposed in an electrode joint between the end-faces of the adjoining electrodes. The seal preferably comprises a material sized so as to fill the gap between the adjoining electrodes. To that end, the seal should advantageously be between about 1 mm and about 25 mm in thickness, more advantageously, between about 3 mm and about 12 mm in thickness. In addition, the seal should extend radially from the perimeter of the electrode joint in towards the center of the joint, terminating between the perimeter and the threaded pin or male threaded stub. Most preferably, the radius of the seal should be approximately equal to that of the electrodes between which it is disposed. Thus, the inventive seal should have a radius of between about 220 mm and about 375 mm (when used with graphite electrodes having a circular cross-section), more preferably between about 200 mm and about 300 mm, with a central opening having a diameter approximately equal to or larger than the diameter of the threaded pin or male stub (at their respective largest point); more particularly, the diameter of the central opening of the seal should be between about 50% and about 85% of the diameter of the electrodes between which it is disposed. In the most preferred embodiment, the central opening of the seal should be approximately equal to the diameter of threaded pin or male stub (at their respective largest point).

The material(s) from which the inventive seal is produced or the orientation or placement of the seal, should be such that the seal is compressible to compensate for differences and changes in the gap between adjoining electrodes, which can vary based on the method used to connect the adjoining electrodes, as well as due to the different mechanical and thermal stresses to which the joint is exposed while in use in the furnace. In addition, compressibility of the seal material can help ensure that air does not pass between the seal and the electrodes between which it is positioned.

The material from which the seal of the present invention is formed should function to slow the rate at which the threads of the electrode joint oxidize. To do so, it has to reduce (or physically block) the exposure of the threads to the hot air in the furnace. More preferably, the seal material should oxidize at a rate equal to or slower than that of the electrodes forming the joint. Most preferably, the seal material should oxidize at as slow a rate as possible, while meeting the compressibility requirements.

Suitable materials useful for forming the inventive seal include paper, cardboard, paste, braided rope, etc. One especially preferred material is compressed particles of expanded (or exfoliated) graphite, sometimes referred to as flexible graphite. Especially useful are sheets of compressed particles of exfoliated graphite.

The graphite useful in forming the seals of the present invention is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

Graphite starting materials for the sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 98%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 350 pph and more typically about 40 to about 160 pph. After the flakes are intercalated, any excess solution is drained from the flakes and the flakes are water-washed.

Alternatively, the quantity of the intercalation solution may be limited to between about 10 and about 40 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalated graphite flake with the organic reducing agent, the blend can be exposed to temperatures in the range of 25° to 125° C. to promote reaction of the reducing agent and intercalated graphite flake. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The above described methods for intercalating and exfoliating graphite flake may beneficially be augmented by a pretreatment of the graphite flake at graphitization temperatures, i.e. temperatures in the range of about 3000° C. and above and by the inclusion in the intercalant of a lubricious additive, as described in International Patent Application No. PCT/US02/39749.

The pretreatment, or annealing, of the graphite flake results in significantly increased expansion (i.e., increase in expansion volume of up to 300% or greater) when the flake is subsequently subjected to intercalation and exfoliation. Indeed, desirably, the increase in expansion is at least about 50%, as compared to similar processing without the annealing step. The temperatures employed for the annealing step should not be significantly below 3000° C., because temperatures even 100° C. lower result in substantially reduced expansion.

The annealing of the present invention is performed for a period of time sufficient to result in a flake having an enhanced degree of expansion upon intercalation and subsequent exfoliation. Typically the time required will be 1 hour or more, preferably 1 to 3 hours and will most advantageously proceed in an inert environment. For maximum beneficial results, the annealed graphite flake will also be subjected to other processes known in the art to enhance the degree expansion—namely intercalation in the presence of an organic reducing agent, an intercalation aid such as an organic acid, and a surfactant wash following intercalation. Moreover, for maximum beneficial results, the intercalation step may be repeated.

The annealing step of the instant invention may be performed in an induction furnace or other such apparatus as is known and appreciated in the art of graphitization; for the temperatures here employed, which are in the range of 3000° C., are at the high end of the range encountered in graphitization processes.

Because it has been observed that the worms produced using graphite subjected to pre-intercalation annealing can sometimes "clump" together, which can negatively impact area weight uniformity, an additive that assists in the formation of "free flowing" worms is highly desirable. The addition of a lubricious additive to the intercalation solution facilitates the more uniform distribution of the worms across the bed of a compression apparatus (such as the bed of a calender station conventionally used for compressing (or "calendering") graphite worms into flexible graphite sheet. The resulting sheet therefore has higher area weight uniformity and greater tensile strength, even when the starting graphite particles are smaller than conventionally used. The lubricious additive is preferably a long chain hydrocarbon. Other organic compounds having long chain hydrocarbon groups, even if other functional groups are present, can also be employed.

More preferably, the lubricious additive is an oil, with a mineral oil being most preferred, especially considering the fact that mineral oils are less prone to rancidity and odors, which can be an important consideration for long term storage. It will be noted that certain of the expansion aids detailed above also meet the definition of a lubricious additive. When these materials are used as the expansion aid, it may not be necessary to include a separate lubricious additive in the intercalant.

The lubricious additive is present in the intercalant in an amount of at least about 1.4 pph, more preferably at least about 1.8 pph. Although the upper limit of the inclusion of lubricous additive is not as critical as the lower limit, there does not appear to be any significant additional advantage to including the lubricious additive at a level of greater than about 4 pph.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compression molded together into flexible sheets having small transverse openings that, unlike the original graphite flakes, can be formed and cut into various shapes, as hereinafter described.

Alternatively, the flexible graphite sheets of the present invention may utilize particles of reground flexible graphite sheets rather than freshly expanded worms. The sheets may be newly formed sheet material, recycled sheet material, scrap sheet material, or any other suitable source.

Also the processes of the present invention may use a blend of virgin materials and recycled materials.

The source material for recycled materials may be sheets or trimmed portions of sheets that have been compression molded as described above, or sheets that have been compressed with, for example, pre-calendering rolls. Furthermore, the source material may be sheets or trimmed portions of sheets that have been impregnated with resin, but not yet cured, or sheets or trimmed portions of sheets that have been impregnated with resin and cured. The source material may also be recycled flexible graphite PEM fuel cell components such as flow field plates or electrodes. Each of the various sources of graphite may be used as is or blended with natural graphite flakes.

Once the source material of flexible graphite sheets is available, it can then be comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. Most preferably the particles have a particle size of no greater than about 20 mesh.

The size of the comminuted particles may be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane electrical and thermal conductivity.

If the source material has been resin impregnated, then preferably the resin is removed from the particles. Details of the resin removal are further described below.

Once the source material is comminuted, and any resin is removed, it is then re-expanded. The re-expansion may occur by using the intercalation and exfoliation process described above and those described in U.S. Pat. No. 3,404,061 to Shane et al. and U.S. Pat. No. 4,895,713 to Greinke et al.

Typically, after intercalation the particles are exfoliated by heating the intercalated particles in a furnace. During this exfoliation step, intercalated natural graphite flakes may be added to the recycled intercalated particles. Preferably, during the re-expansion step the particles are expanded to have a specific volume in the range of at least about 100 cc/g and up to about 350 cc/g or greater. Finally, after the re-expansion step, the re-expanded particles may be compressed into flexible sheets, as hereinbefore described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, fluoro-based polymers, or mixtures thereof. Suitable epoxy resin systems include those based on diglycidyl ether or bisphenol A (DGEBA) and other multifunctional resin systems; phenolic resins that can be employed include resole and novolac phenolics. Optionally, the flexible graphite may be impregnated with fibers and/or salts in addition to the resin or in place of the resin.

The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

The thusly-formed flexible graphite sheet, formed so as to have the required central opening can be used as is, or it can be formed into a laminate of several such flexible graphite sheets (without or without an interlayer adhesive) and used as the inventive seal in that manner. For example, sheets of compressed particles of exfoliated graphite are overlaid, preferably with the use of an adhesive therebetween, and then trimmed to the desired size and shape if necessary, to form individual end face seal component elements. In a preferred embodiment, the sheets are provided in generally the desired shape and size of the final seal component elements.

In another embodiment, because of the anisotropic nature of sheets of compressed particles of expanded graphite, the graphite sheet seal can be oriented such that the "a" direction, that is the direction parallel to the major opposed surfaces of the sheet, is directionally arrayed between the end faces of the electrodes. In this way, the higher electrical conductivity of the material in the "a" direction will improve the conductivity across the joint, as opposed to the "c" direction.

As noted above, transport of a seal which is up to approximately 750 mm or more in diameter and up to about 25 mm in thickness, with a large central opening can be difficult and inefficient. In order to facilitate storage and transport of the inventive seal, it is formed into a plurality of individual elements, preferably three. Indeed, the three elements should be approximately the same size. Thus, where the inventive seal is circular in configuration, the individual elements each should assume the same approximate angular length. The individual elements can then be placed about the circumference of an electrode to be joined into an electrode joint such that the individual elements of the inventive seal combine to form an entire seal about the circumference of the electrode joint.

The ensure proper placement of the seal elements to form an end-face seal for graphite electrode joints, the seal elements should be capable of being joined so as to form a unitary whole. To facilitate this, each seal elements should have a mating structure on its end, which can mate with a complementary mating structure on an adjoining seal element. Suitable mating structures can include interlocking structures such as corrugations or jagged edges, which can mate to at least partially lock adjoining seal elements together. In a preferred embodiment, the complementary mating structures can comprise a notch and mating tongue structures. For instance, each element can have a mating tongue at one end and a notch at the other end, thus allowing three elements to interlock to form a unitary end-face seal.

The individual elements from which the inventive seal is assembled can be formed by cutting the individual seal elements out of, for example, a sheet or block (in the case of a laminate) of flexible graphite material. Preferably, however, in order to help ensure that the individual elements interlock optimally, the end-face seal is formed as described above, and then each seal end is provided with the above-described interlocking structures using, for instance, a saw, a laser, a cutting blade, or other device which would be familiar to the skilled artisan.

One embodiment of the inventive seal is illustrated in FIG. 1 and designated by the reference character 10. Seal 10 comprises a spiral wound sheet of flexible graphite, and has its "a" direction through the thickness of seal 10, rather than along its surface. Seal 10 can be formed, for instance, by winding one or more flexible graphite sheets around a bolster 100 having a diameter equal to the desired diameter of the central opening "d" of seal 10. The sheets are wound around bolster 100 until a radius equal to the desired radius of seal 10 is achieved, resulting in a spiral wound flexible graphite cylinder 20, which can be sliced into individual seals 10 of the desired thickness (either through bolster 100 or after removal of bolster 100). In this way, the "a"

direction of higher conductivity is arrayed through the thickness of seal 10. Optionally, an adhesive can be interposed between the windings of seal 10 in order to prevent the spiral-wound seal 10 from unwinding.

Figure 6:
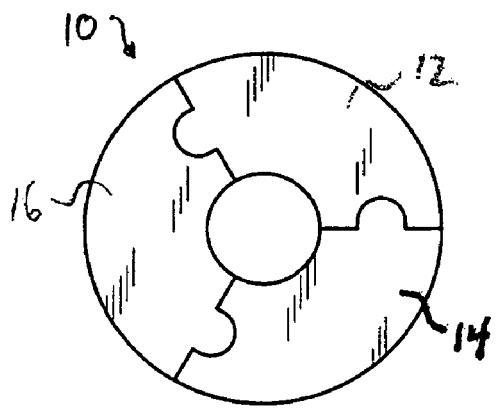
FIG. 6 is a top plan view of the multi-part end-face seal for graphite electrodes of FIG. 1.
Figure 8:
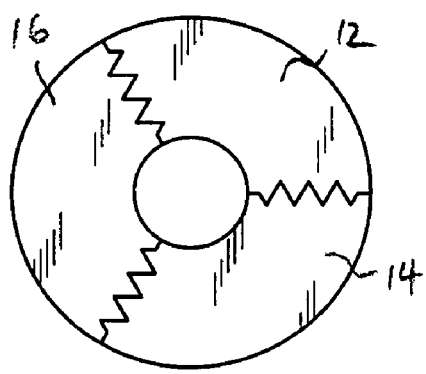
FIG. 8 is a top plan view of another embodiment of a multi-part end-face seal for graphite electrodes in accordance with the present invention.
Figure 7:
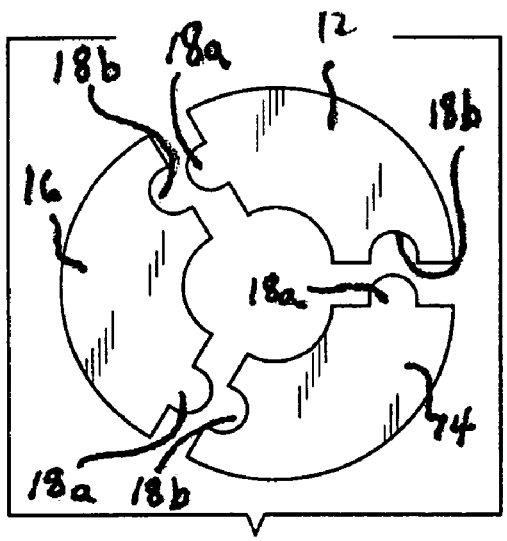
FIG. 7 is a top exploded view of the multi-part end-face seal for graphite electrodes of FIG. 6.
Figure 9:
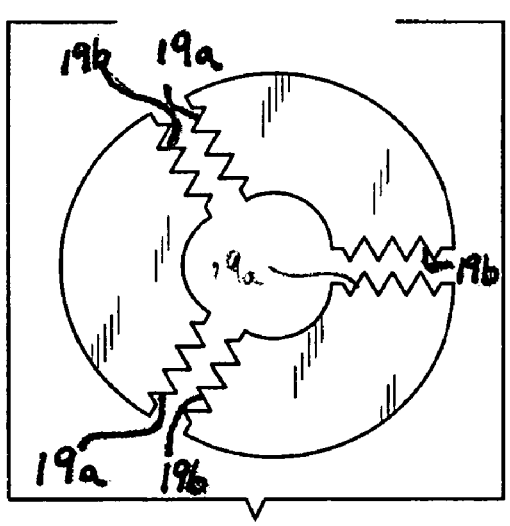
FIG. 9 is a top exploded view of the multi-part end-face seal for graphite electrodes of FIG. 8.

Alternatively, seal 10 can be formed by winding one or more flexible graphite sheets around a bolster 100 until a radius equal to the desired radius of seal 10 is achieved, and spiral wound cylinder 20 then compressed into the final desired thickness and shape. Once formed, seal 10 can be divided into, e.g., three approximately equal elements, denoted 12, 14 and 16, having one of mating structures 18a and 18b at the ends thereof, as illustrated in FIGS. 6 and 7. An alternate set of mating structures, 19a and 19b, is illustrated in FIGS. 8 and 9.

Figure 3:
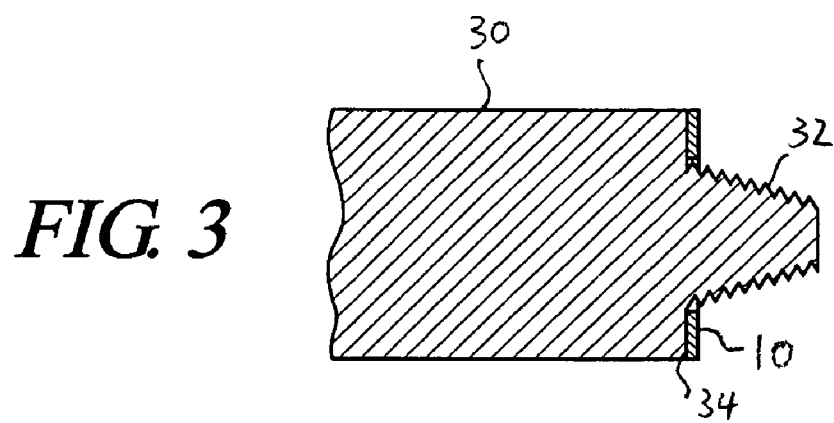
FIG. 3 is a partial side cross-sectional view of a male threaded graphite electrode having a multi-part end-face seal in accordance with the present invention thereon.
Figure 4:
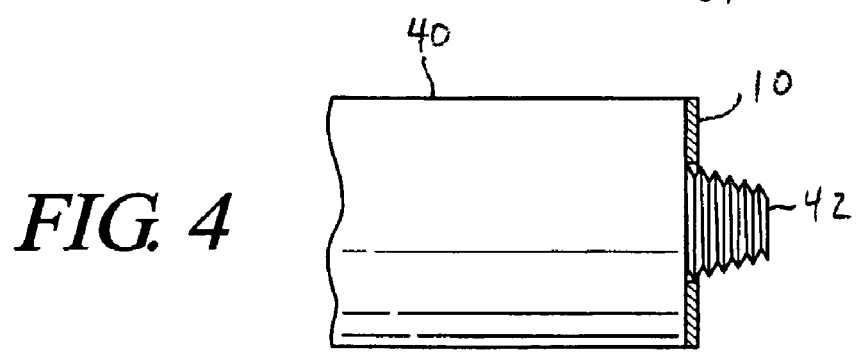
FIG. 4 is a partial side cross-sectional view of a graphite electrode having a pin threaded thereinto and having a multi-part end-face seal in accordance with the present invention thereon.

Seal 10 is positioned between the end faces of adjoining graphite electrodes forming an electrode joint. For example, as illustrated in FIG. 3, when a graphite electrode 30 having a machined male threaded stub 32 is employed, seal 10 can be placed on end face 34 of electrode 30 about stub 32. When electrode 30 is then mated with an adjoining electrode having a machined female socket (not shown), therefore, seal 10 is positioned between the end faces of the adjoining electrodes. The same holds true for electrode 40, illustrated in FIG. 4, which uses a pin 42 rather than a stub.

Advantageously, seal 10 is positioned on electrode 30 during preparation of electrode 30, either at the forming plant or at the furnace site but prior to being brought into position above the furnace for loading onto the electrode column to reduce the operational steps of forming the joint (which often takes place in a relatively hazardous environment). Likewise, when pin 42 is pre-set into electrode 40, seal 10 can be positioned on electrode 40 at the same time.

Figure 5:
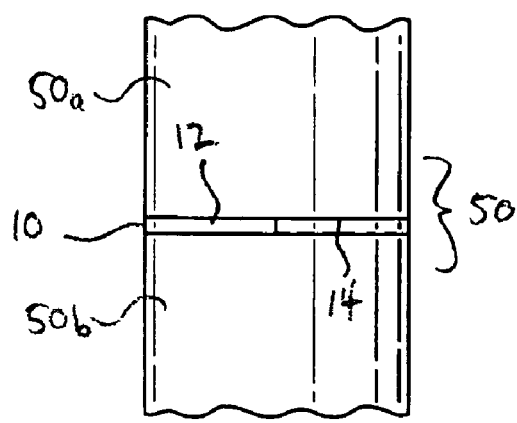
FIG. 5 is a side plan view of an electrode joint having a multi-part end-face seal in accordance with the present invention therein.

Accordingly, in use, electrode end-face seal 10 is positioned between the adjoining electrodes 50a and 50b in an electrode joint 50, as illustrated in FIG. 5. Since seal 10 is compressible and advantageously oxidizes at a rate equal to or slower than that of electrodes 50a and 50b, it reduces oxygen ingress into joint 50 between the end faces of electrodes 50a and 50b and thereby reduces or eliminates oxidation of the threaded portions or pin 32 or male stub 42, and/or other surfaces of joint 50, extending the life and functionality of joint 50.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An electrode joint comprising two joined graphite electrodes and having a seal interposed between the electrodes, the seal comprising a plurality of individual elements interlocked to form a unitary whole, and formed of a material having an oxidation rate such that the oxidation rate of surfaces of the electrode joint is reduced, wherein the seal is compressible and comprises a spiral wound sheet of compressed particles of exfoliated graphite having electrical conductivity greater in the direction extending between the electrodes than in the direction orthogonal thereto.

2. The joint of claim 1 wherein the individual elements each have mating structures on the ends thereof to facilitate interlocking.

3. The joint of claim 2 wherein the mating structures comprise corresponding notches and tongues.

4. A process for preparing an end-face seal for use in an electrode joint, the process comprising providing a sheet of compressed particles of exfoliated graphite; winding the sheet to form a spiral wound seal suitable for use between the electrodes in an electrode joint; and dividing the spiral wound seal into individual elements capable of being interlocked to form an end-face seal, wherein the individual elements each have mating structures on the ends thereof to facilitate interlocking.

5. The process of claim 4 wherein the seal has an outer diameter generally equal to the outer diameter of the electrode joint and a central opening.

6. The process of claim 5 wherein the seal comprises layers of the sheet of compressed particles of exfoliated graphite from which it is formed and further wherein an adhesive is interposed between the layers of the spiral wound seal of compressed particles of exfoliated graphite.

7. The process of claim 5 wherein the sheet of compressed particles of exfoliated graphite is wound around a bolster having a diameter equal to the central opening of the seal.

8. The process of claim 7 wherein the sheet of compressed particles of exfoliated graphite wound around a bolster is cut to the thickness necessary to fill the gap between the electrodes in an electrode joint after winding.

9. The process of claim 4 wherein the mating structures comprise corresponding notches and tongues.

10. A seal for an electrode joint comprising two electrodes, the seal comprising a material having an oxidation rate equal to or less than the oxidation rate of the electrodes in the electrode joint, wherein the seal is compressible and comprises a spiral wound sheet of compressed particles of exfoliated graphite and further wherein the electrical conductivity of the seal when in an electrode joint is greater in the direction extending between the electrodes than in the direction orthogonal thereto.

* * * * *